US012197284B2

(12) United States Patent
Swami et al.

(10) Patent No.: US 12,197,284 B2
(45) Date of Patent: Jan. 14, 2025

(54) DATA STORAGE DEVICE AND METHOD FOR USING ZONES OF MEMORY IN A READ SCRUB OPERATION

(71) Applicant: Western Digital Technologies, Inc., San Jose, CA (US)

(72) Inventors: Maharudra Nagnath Swami, Bangalore (IN); Nitin Jain, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 16 days.

(21) Appl. No.: 18/222,044

(22) Filed: Jul. 14, 2023

(65) Prior Publication Data

US 2024/0152423 A1  May 9, 2024

Related U.S. Application Data (60) Provisional application No. 63/423,563, filed on Nov. 8, 2022.

(51) Int. Cl.
*G06F 11/10* (2006.01)
*G06F 11/07* (2006.01)

(52) U.S. Cl.
CPC ........ *G06F 11/1068* (2013.01); *G06F 11/076* (2013.01)

(58) Field of Classification Search
CPC . G06F 11/1068; G06F 11/076; G06F 11/1048
See application file for complete search history.

(56) References Cited

U.S. PATENT DOCUMENTS

| 9,053,808 | B2* | 6/2015 | Sprouse | G11B 20/18 |
| 9,230,689 | B2 | 1/2016 | Tuers et al. | |
| 9,552,171 | B2 | 1/2017 | Huang et al. | |
| 11,194,489 | B2 | 12/2021 | Alrod et al. | |
| 2017/0075593 | A1* | 3/2017 | Kim | G06F 3/0653 |
| 2019/0065331 | A1* | 2/2019 | Singidi | G11C 29/883 |
| 2019/0155746 | A1* | 5/2019 | Bhatia | G06F 12/0246 |

* cited by examiner

*Primary Examiner* — Albert Decady
*Assistant Examiner* — Grace V Braden
(74) *Attorney, Agent, or Firm* — Crowell & Moring LLP (57) ABSTRACT

A read to a wordline can cause a read disturb error on neighboring wordlines. Instead of scanning the entire memory to identify wordlines that have a read disturb problem, a localized read scan approach can be used. In this approach, the memory is organized into several zones, where each zone contains several wordlines. The number of reads in each zone is tracked, and, after a certain number of reads, the data in the zone is read. If the error rate of the data exceeds a threshold, the data is relocated to another area of the memory.

20 Claims, 7 Drawing Sheets

DATA STORAGE DEVICE AND METHOD FOR USING ZONES OF MEMORY IN A READ SCRUB OPERATION

CROSS-REFERENCE TO RELATED APPLICATION

This application claims priority to U.S. provisional patent application No. 63/423,563, filed Nov. 8, 2022, which is hereby incorporated by reference.

BACKGROUND

Read disturb is a phenomenon in NAND flash memory where reading data from a flash cell can cause the threshold voltages of other (unread) cells in the same block to shift to a higher value. While a single threshold voltage shift is small, such shifts can accumulate over time with multiple reads falling on single cell, eventually becoming large enough to alter the state of certain cells and, hence, generate read disturb errors. The failure mechanism of a read disturb error is similar to the mechanism of a normal program operation. A read operation applies a high pass-through voltage (e.g., +6 V) to all other cells that share the same bitline with the cell that is being read. Although the pass-through voltage is not as high as the programming voltage, it still generates a weak programming effect on the cells it is applied to, which can unintentionally change these cells' threshold voltages. To prevent a read disturb from leading to an uncorrectable data error, the data storage device can identify a wordline that is about to encounter an uncorrectable data error and perform a read scrub operation to refresh the data.

DETAILED DESCRIPTION

The following embodiments generally relate to a data storage device and method for using zones of memory in a read scrub operation. In one embodiment, a data storage device is provided comprising a controller and a memory configured to be organized into a plurality of zones, each zone comprising a plurality of wordlines. The controller is configured to: track a number of times each of the plurality of zones has been read; and in response to a zone of the plurality of zones being read more than a threshold number of times: read data from at least some of the wordlines in the zone; determine if an error rate of the read data exceeds an error threshold; and in response to determining that the error rate exceeds the error threshold, write data of the zone in another area of the memory.

In another embodiment, a method is provided that is performed in a data storage device comprising a memory organized into a plurality of zones, each zone comprising a plurality of wordlines. The method comprises: receiving a read command from a host; generating a unique identifier based on a physical location in the memory that is associated with the read command, wherein the unique identifier is associated with one of the plurality of zones; searching for the unique identifier in a hash table that tracks how many times each of the plurality of zones has been read; in response to finding the unique identifier in the hash table, increasing a counter value in an entry in the hash table that is associated with the unique identifier; determining whether the counter value exceeds a first threshold; in response to determining that the counter value exceeds the first threshold, determining whether a bit error rate of data in the zone associated with the unique identifier exceeds a second threshold; and in response to determining that the bit error rate exceeds the second threshold, move the data to another location in the memory.

In yet another embodiment, a data storage device is provided comprising: a memory configured to be organized into a plurality of zones, each zone comprising a plurality of wordlines; means for generating a unique identifier based on a physical location in the memory that is associated with a read command, wherein the unique identifier is associated with one of the plurality of zones; means searching for the unique identifier in a hash table that tracks how many times each of the plurality of zones has been read; means for, in response to finding the unique identifier in the hash table, increasing a counter value in an entry in the hash table that is associated with the unique identifier; means for determining whether the counter value exceeds a threshold; means for, in response to determining that the counter value exceeds the threshold, moving the data associated with the zone to a faster memory for faster reading of the data. Other embodiments are provided and can be used alone or in combination.

Figures 1A, 1B:
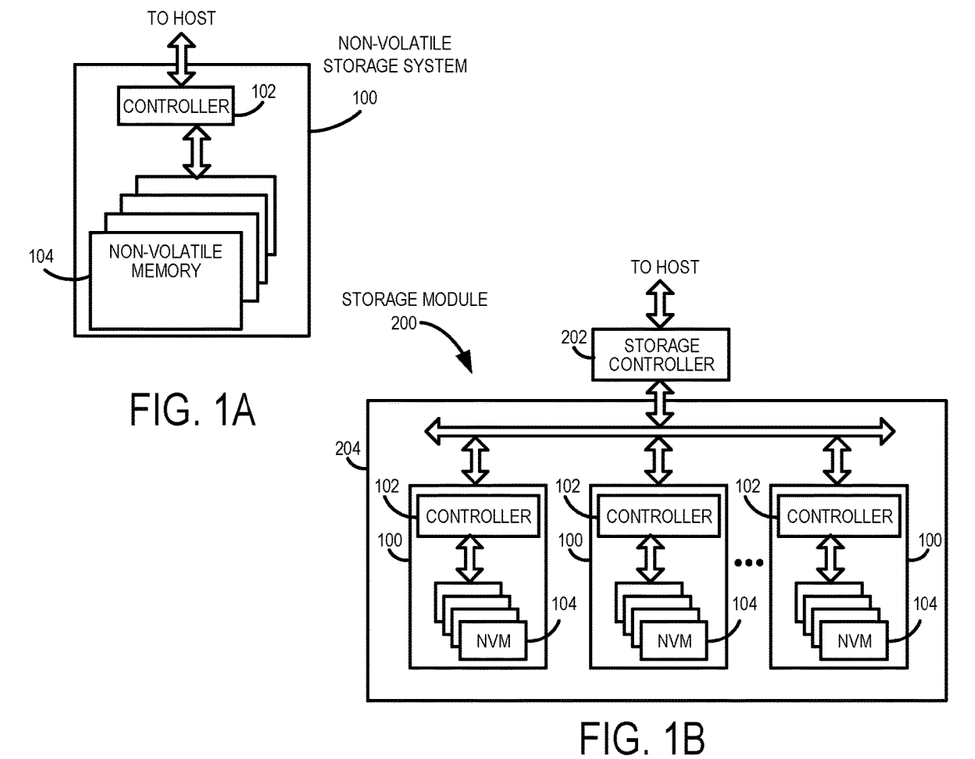
FIG. 1A is a block diagram of a non-volatile storage system of an embodiment.
FIG. 1B is a block diagram illustrating a storage module of an embodiment.
Figure 1C:
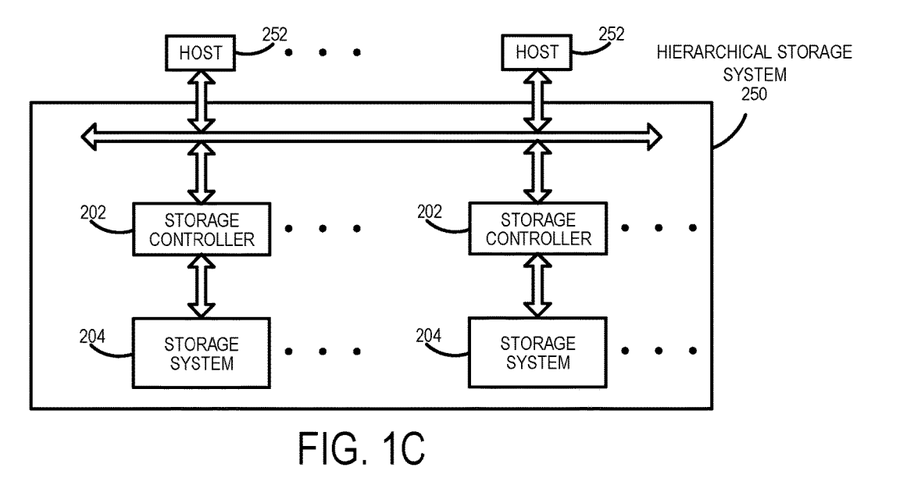
FIG. 1C is a block diagram illustrating a hierarchical storage system of an embodiment.

Turning now to the drawings, storage systems suitable for use in implementing aspects of these embodiments are shown in FIGS. 1A-1C. A storage system is sometimes referred to herein as a data storage device (DSD), which refers to a device that stores data (e.g., hard disk drives (HDDs), solid state drives (SSDs), tape drives, hybrid drives, etc.). FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level (one-bit per cell) cells (SLC) or multiple-level cells (MLC), such as two-level cells, triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
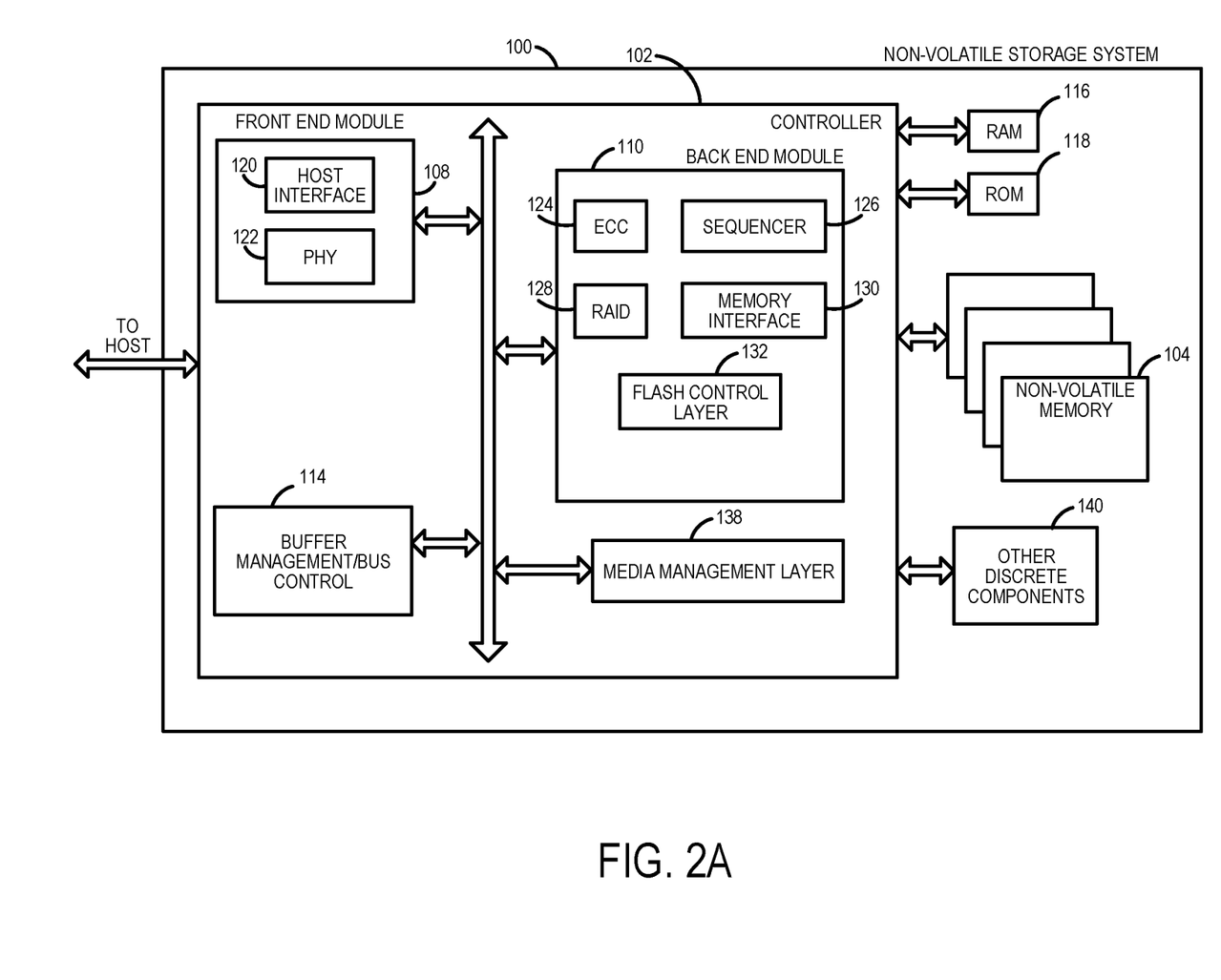
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
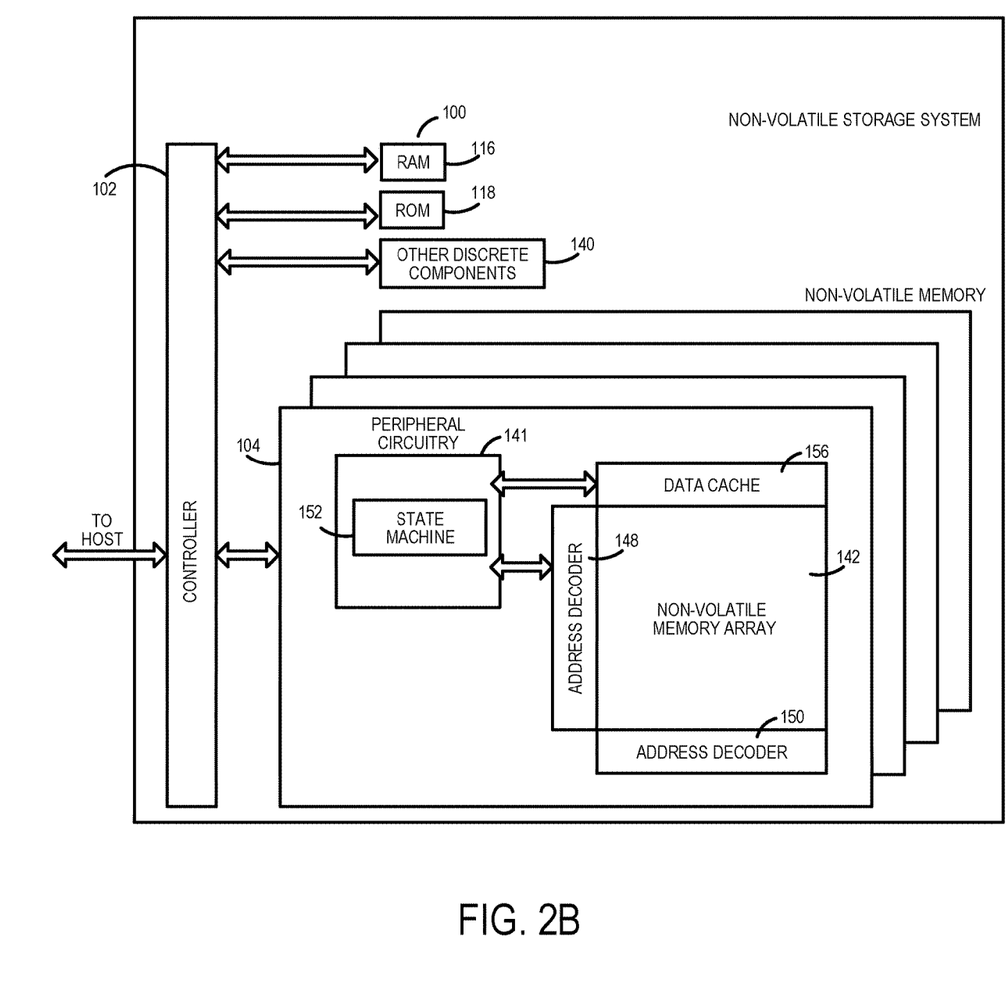
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
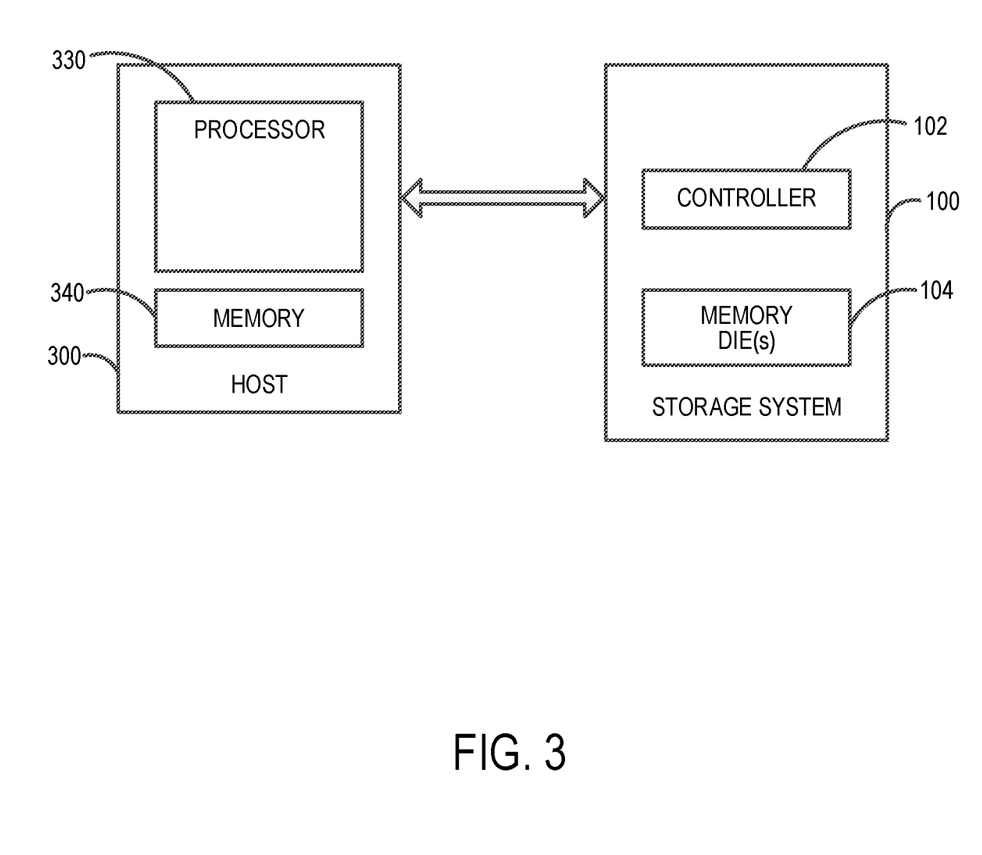
FIG. 3 is a block diagram of a host and storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

As discussed above, read disturb is a phenomenon in NAND flash memory where reading data from a flash cell can cause the threshold voltages of other (unread) cells in the same block to shift to a higher value. While a single threshold voltage shift is small, such shifts can accumulate over time with multiple reads falling on single cell, eventually becoming large enough to alter the state of certain cells and, hence, generate read disturb errors. The failure mechanism of a read disturb error is similar to the mechanism of a normal program operation. A read operation applies a high pass-through voltage (e.g., +6 V) to all other cells that share the same bitline with the cell that is being read. Although the pass-through voltage is not as high as the programming voltage, it still generates a weak programming effect on the cells it is applied to, which can unintentionally change these cells' threshold voltages. To prevent a read disturb from leading to an uncorrectable data error, the data storage device can identify a wordline that is about to encounter an uncorrectable data error and perform a read scrub operation to refresh the data.

Figure 4:
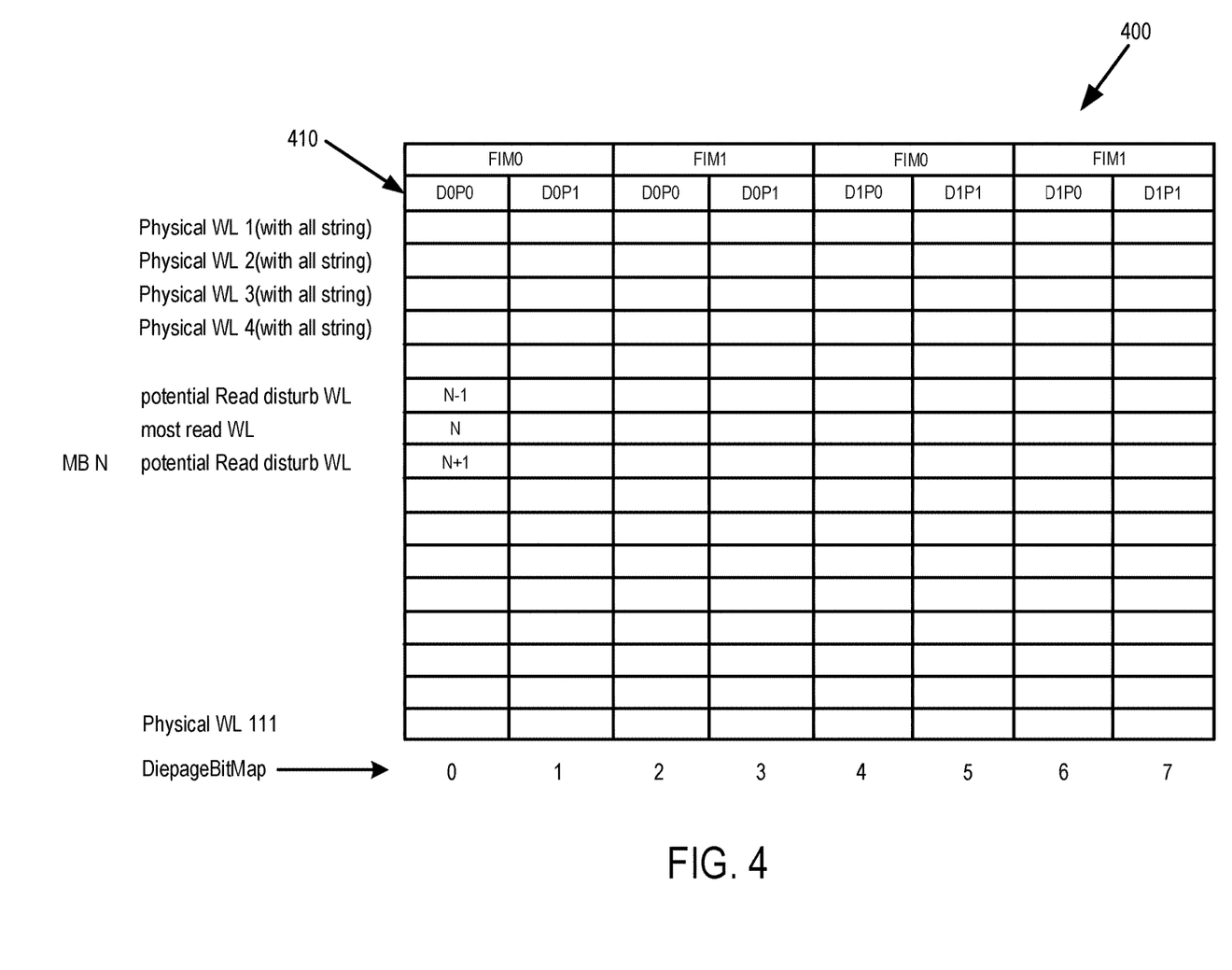
FIG. 4 is an illustration of a memory of an embodiment.

FIG. 4 is an illustration of an example memory that illustrates the read disturb problem. The memory depicted in FIG. 4 is one metablock 400, which is a logical combination of physical blocks 410 that are distributed across two flash interface modules (FIM0 and FIM1), where each FIM has two dies (D0 and D1), with each die having two planes (P0 and P1). The various dies on the FIMs are mapped to a DiepageBitMap with values 0 to 7. In this example, each die plane has 112 wordlines, with a plurality of memory cells on each wordline. It is important to note that the organization of this example memory is just for illustration purposes and that other types of organizations can be used. Accordingly, any details of this memory should not be read into the claims unless expressly recited therein.

As shown in FIG. 4, the most-read wordline (WL N) in DiepageBitMap 0 potentially causes a read disturb on the neighboring wordlines (WL N+1 and WL N−1). That is, repeated read access on WL N can cause read disturb on WL N+1 and WL N−1, which can lead to a subsequent read failure of those two wordlines. To avoid such failure, the controller 102 of the data storage device 100 can employ a read scrub (RS) algorithm to identify the potentially-read-disturbed wordlines (here, WL N+1 and WL N−1) and scan (read) them. If the bit error rate (BER) of the potentially-read-disturbed wordlines is higher than a read scrub BER threshold, the controller 102 can relocate the data from those wordlines to another physical location (e.g., other wordlines), thereby nullifying the effect of the read disturb.

Various types of read scrub techniques can be used. One technique is called "active scan." Active Scan is a time-based read scrub technique where the controller 102 triggers a periodic scan at pre-determined times (e.g., every 32 hours) of all valid wordlines in a given partition of the memory 104. If a read disturb occurs before starting an active scan or before the next trigger time, this read scrub technique will not catch the read disturb and will fail to take corrective actions. Accordingly, the problem with the active scan technique is that it does not assure catching potential wordlines where read disturbs may have occurred. Further, actively scanning a large partition can take a relatively-long time and consume resources (e.g., tracking frequently-read wordlines can require a very large memory to store the tracking table).

Another type of read scrub technique is called a random-read-counter-based scan, which triggers a scan of neighboring wordlines after a pre-determined read command count for a given wordline has been reached. For example, if the pre-determined number is 1,000, when the controller 102 receives the 1,000$^{th}$ read command for a wordline, the controller 102 triggers a read scan of the neighboring wordlines. If the controller 102 finds the BER of those neighboring wordlines is higher than the read scrub BER threshold, the controller 102 reads the data from those wordlines, error corrects the read data, and writes the error-corrected data to fresh wordlines. There may be several disadvantages to this technique. For example, if the data being read is spread across many metablocks, relying on only a particular read physical location to check for high BER may not be optimal. Additionally, this technique is not a preventive mechanism and does not catch a problem before it occurs.

Figure 5:
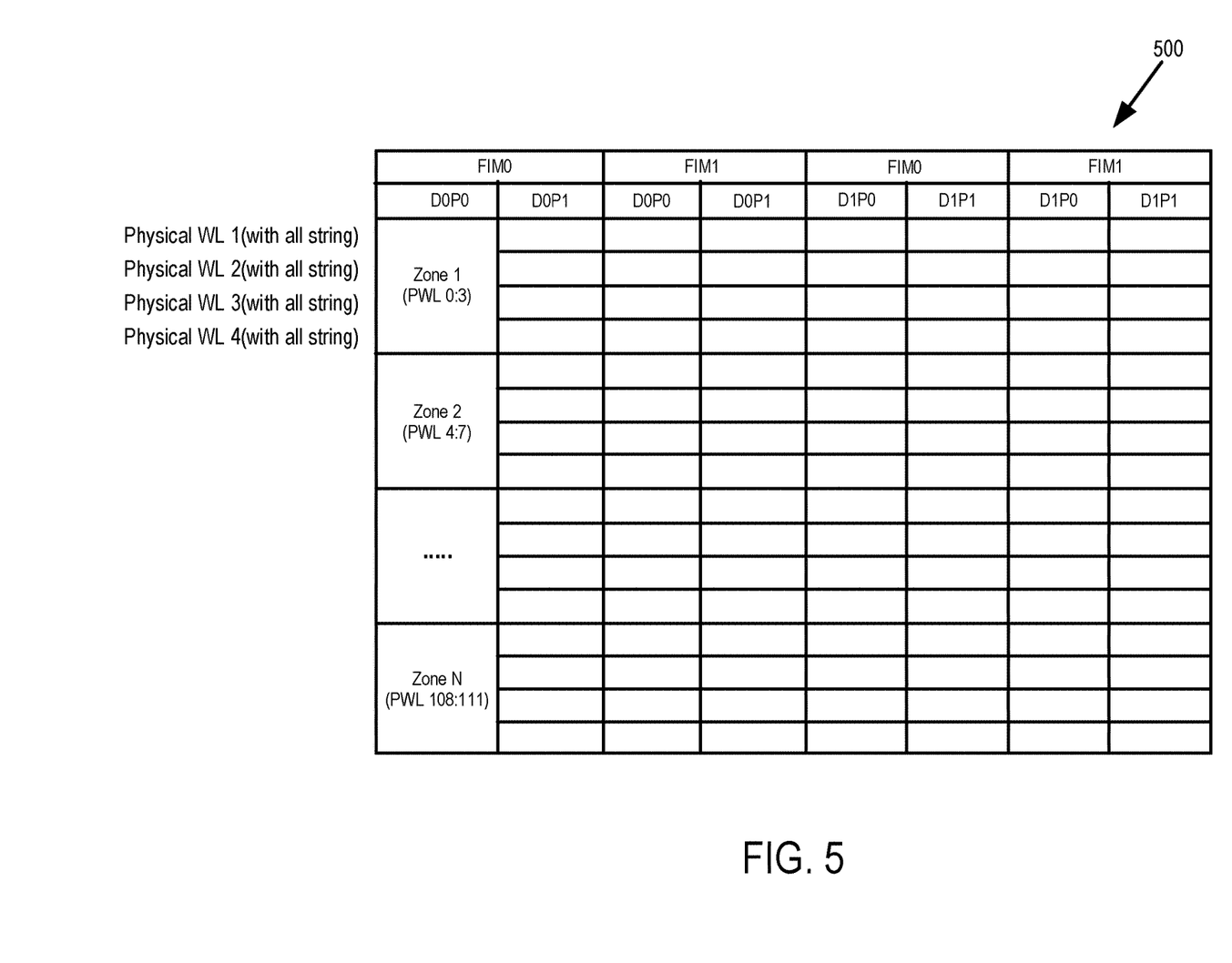
FIG. 5 is an illustration of a memory of an embodiment that is organized into zones of memory locations.

To address these issues, the following embodiments provide a way to efficiently track physical locations in the memory 104 to find potential read disturb area. That is, these embodiments can effectively track repeatedly-read locations in the memory 104 to find potential read disturb locations. In one embodiment, a zone-based approach is used to track the most-read wordlines and then perform a read scan/BER check on only a localized portion of the wordlines instead of using the read scrub mechanisms noted above. FIG. 5 shows a memory organization 500 that illustrates this embodiment. As shown in FIG. 5, the memory is organized into a plurality of zones for read command tracking, where each zone comprises a plurality of wordlines. In this particular example, the 112 wordlines in a plane are divided into 28 zones (Zone #1 has WLs 0 to 3, Zone #2 has WL 4 to 7, etc.), where each zone comprises four wordlines (each wordline has four strings), but a zone can have any suitable number of wordlines greater than one to track read disturbs at a desired granularity. Also, the zones can be present in any metablock of the memory.

It should be noted that the term "zone" is being used herein to refer to a set of more than one. The term "zone" as sometimes used in other contexts (e.g., in the NVMe standard) to refer to a logical block address range that is written sequentially, cannot be directly overwritten, and is managed by the host instead of the data storage device. To be clear, the term "zone" is used herein merely to refer to a set of more than one and not necessarily in that other specialized context.

The following paragraphs provide an example of one particular implementation of an embodiment. It is important to note that is merely one example implementation and that other implementations can be used. Accordingly, none of the details presented herein should be read into the claims unless expressly recited therein.

In this example implementation, the controller 102 tracks a read occurring in a zone using an rs_key structure, which contains four factors that form a unique physical location identifier:

```
struct rs_key{
    uint16 mb; // for valid MB
    uint16 dpBitmap; // depicts plane block in MB
    uint16 phy_block; // physical block number
    uint16 wl_zone; // wl_zone for read tracking
};
```

The rs_key structure has a metablock and a physical block as members where the read is expected to land. dpBitMap is used to locate the correct physical block in a given metablock (dpBitMap value "0" indicates physical block in D0P0 and "1" indicates D0P1); and wl_zone indicates the correct physical word line zone in given physical block. Note that: wl_zone calculation=physical_wordline/4 (current wl_zone size).

To track multiple zones where reads may fall, a hash table implementation of rs_table structure is used due to its efficient search and new-entry-insert mechanism:

```
struct rs_table{
    uint32 counter; // this is unique counter per zone and increased
per read landing in that zone
    struct rs_key rs_entry; // it is 8 byte in size - unique identifier
```

A counter is maintained per zone and updated on each read in a particular zone. For a key in the hash table, a unique identifier from the rs_key structure is used, with a size of eight bytes:

struct rs_table rs_entries{5000};

In this example, 5,000 unique zone entries for host reads are tracked for a 250 GB capacity memory, which can track approximately 4 GB of user space. This 4 GB space does not represent a contiguous region in user space, and the zones can be spread across the user space. The value of 5,000 is configurable and can be changed as required for different capacities and specific user patterns.

Figure 6:
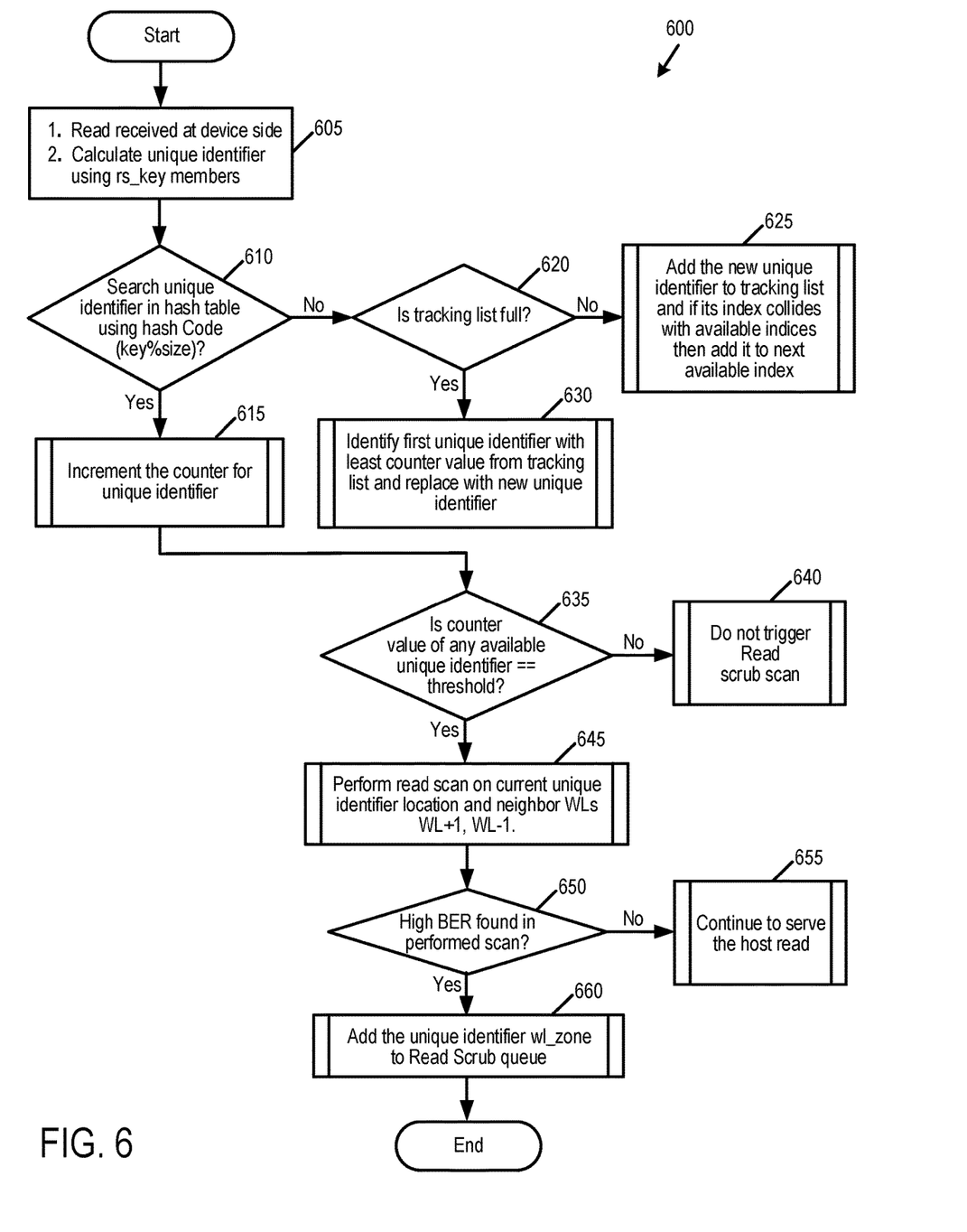
FIG. 6 is a flow chart of a method of an embodiment that uses zones of memory locations to identify wordlines for a read scrub operation.

FIG. 6 is a flow chart 600 of a method using this architecture. As shown in FIG. 6, when a read command is received by the controller 102, the controller 102 calculates a unique identifier as per the rs_key structure (act 605). The unique identifier consists of the metablock, physical block, bitmap to get physical location in a metablock, and wordline zone. The same unique identifier is used in the hash table as key. Once the unique identifier is calculated, the controller 102 searches for the identifier in the hash table rs_entries (act 610). If unique identifier already exists, then counter of the same identifier is incremented by one (act 615). If the unique identifier is not present in rs_entries, the controller 102 determines if rs_entries is full (act 620). If rs_entries is not full, the unique identifier is inserted in appropriate index or next available index (act 625). If rs_entries is full, the controller 102 replaces the rs_entry with the least counter value with new unique identifier (act 630).

If any unique identifier's counter reaches to a predefined read scan threshold, then WL+1 and WL-1 are scanned for high BER (acts 635, 645) (even more neighboring wordlines can be scanned, and the number of neighboring wordlines to be scanned can be configurable). Otherwise, a read scan is not triggered (act 640). If a high BER is found on any of neighboring wordlines, the controller 102 adds the whole zone contains the wordlines to a read scrub queue for later relocation (acts 650, 660); otherwise, the controller 102 continues to the next host read (act 655).

There are several alternatives that can be used with these embodiments. For example, using a zone-based algorithm to ascertain frequently-read locations can be used for several other purposes, such as moving data from a relatively-slower memory (e.g., a multi-level cell (MLC) block) in the zone to a relatively-faster memory (e.g., a single-level cell (SLC) block) for faster read access. More specifically, the hash table method discussed above can be used to decide whether to move zone data to faster memory for the purpose of fast reading of that data in the future (e.g., to SLC memory, which is faster to read than MLC memory). So, once a pre-configured zone-read threshold is hit for a zone, the zone can be moved to the faster memory. Whereas the above embodiments also used a BER check as a second threshold, in this alternative, the counter/read frequency also can be used as the sole threshold, so that data in frequently-read zones can be moved to faster memory. This data movement can be done much before those zones experiencing BER issues. So, this threshold can be smaller than the threshold to initiate the BER scan for read scrub. For example, if the BER-related threshold is 1,000, this new zone-read threshold can be configured at 100. In one example implementation, the method shown in the flow chart 600 in FIG. 6 can be used up until act 635. Thereafter, if a zone-read threshold has been met, the zone data can be moved to faster non-volatile memory, such as SLC memory.

As another example, the embodiments for addressing the localized effect of read disturb can be used in conjunction with the active read scan algorithm discussed above to catch read issues arising due to both data retention and read disturb. However, the embodiments presented herein can take care of the "read disturb" aspects of both commonly-used read scrub techniques noted above (active scan and read counter-based scan). So, with these embodiments, the read counter-based scan method does not need to be used in many situations.

Also, while a threshold for checking a zone for read disturb was set at 1,000 in the above example, it should be understood that a different threshold can be used, and the threshold can be dynamically configurable (e.g., it can be set higher or lower per product use case). It can also be dynamically changed during the lifetime of the data storage device based on whether relaxed or aggressive read scans are needed. Since checking a zone for a read disturb is done only when the desired threshold is met, the checking of the zone should not contribute to the read disturb problem; rather it actually increases the possibility of catching read disturbs.

Another alternative relates to optimization of the hash table. The search complexity can be O(1) most of the time and, in some cases, can exceed beyond O(1). However, if a prime number is chosen as the hash table length, then, almost all the time, the indexing generated by the algorithm is unique. Indexing is used to refer to a unique key that identifies a unique zone. When a unique key is generated for each zone of interest, the search complexity is O(1). So, for a capacity of 256 GB, if 4,999 (a prime number) is chosen instead of 5,000, the search complexity is reduced by a significant extent. Similarly, to track higher drive capacities, another prime number (e.g., 10,007 or 20,011) can be used as the length of the hash table. Further various combinations of Die-Plane, Zone #, Physical Block, and Metablock numbers can be used to generate a unique key.

There are several advantages associated with these embodiments. For example, the use of these embodiments can result in a higher probability of finding a read disturbed wordline and prevent subsequent read failures. Additionally, these embodiments provide a generic and efficient mechanism that is scalable for various memory capacities. Further, these embodiments can work at a physical location level to detect potential read disturbs spanning across a significantly big user space and can be used to take preventive action and avoid read failures. This can improve reliability of the data storage device.

As an example of another advantage, these embodiments, by addressing the localized effect for read disturb, overcome the disadvantages of the active scan technique described above. Active scan can be an expensive operation that is triggered at large periodic intervals (e.g., every 32 hours). As such, active scan may not be suited for read-intensive use cases, such as long and immersive gaming applications, where a read disturb can happen before the next active scan cycle triggers. To reduce overall execution latency involved in active scan operation, active scanning can be skipped on all unique entries available in the hash table. As these entries represent frequently-read zones, the data retention problem is unlikely to be present in these zones. In this way, these embodiments can help reduce active scan latency. The hash table implementation solves the localized read disturb problem better than both active scan and the read counter-based read scrub method. Further, these embodiments provide a middle path between these two techniques with increased efficacy to catch read disturbs.

Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/ or over a substrate may be arranged in two or three dimensions, such as a two-dimensional (2D) memory structure or a three-dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A data storage device comprising:
a memory comprising a block configured to be organized into a plurality of zones of wordlines, each zone comprising a plurality of wordlines; and
a processor coupled with the memory and configured to:
track a number of times each of the plurality of zones has been read; and
in response to a zone of the plurality of zones being read more than a threshold number of times:
read data from at least some of the wordlines in the zone;
determine if an error rate of the read data exceeds an error threshold; and
in response to determining that the error rate exceeds the error threshold, write data of the zone in another area of the memory instead of performing a read scrub operation on an entirety of the block based on a number of times the block has been read.

2. The data storage device of claim 1, wherein the processor is further configured to track the number of times each of the plurality of zones has been read by maintaining a counter for each of the plurality of zones.

3. The data storage device of claim 1, wherein the processor is further configured to track the number of times each of the plurality of zones has been read using a hash table.

4. The data storage device of claim 3, wherein length or size of the hash table is a prime number.

5. The data storage device of claim 1, wherein the processor is further configured to generate a unique identifier for each of the plurality of zones.

6. The data storage device of claim 5, wherein the unique identifier is generated from one or more of the following: a metablock number, a plane-block number, a physical block number, and a wordline zone number.

7. The data storage device of claim 1, wherein the threshold number of times is configurable.

8. The data storage device of claim 1, wherein a number of wordlines in each of the plurality of zones is configurable.

9. The data storage device of claim 1, wherein the memory comprises a three-dimensional memory.

10. In a data storage device comprising a memory comprising a block organized into a plurality of zones of wordlines, each zone comprising a plurality of wordlines, a method comprising:
receiving a read command from a host;
generating a unique identifier based on a physical location in the memory that is associated with the read command, wherein the unique identifier is associated with one of the plurality of zones and wherein the physical location comprises a physical address;
searching for the unique identifier in a hash table that tracks how many times each of the plurality of zones has been read;
in response to finding the unique identifier in the hash table, increasing a counter value in an entry in the hash table that is associated with the unique identifier;
determining whether the counter value exceeds a first threshold;
in response to determining that the counter value exceeds the first threshold, determining whether a bit error rate of data in the zone associated with the unique identifier exceeds a second threshold; and
in response to determining that the bit error rate exceeds the second threshold, move the data to another location in the memory instead of performing a read scrub operation on an entirety of the block based on a number of times the block has been read.

11. The method of claim 10, wherein a number of entries in the hash table is a prime number.

12. The method of claim 10, wherein the unique identifier is generated from one or more of the following: a metablock number, a plane-block number, a physical block number, and a wordline number.

13. The method of claim 10, further comprising:
in response to not finding the unique identifier in the hash table, determining whether a tracking list in the hash table is full.

14. The method of claim 13, further comprising:
in response to determining that the tracking list in the hash table is full, identifying a first unique identifier with a lowest counter value and replacing the first unique identifier with the unique identifier.

15. The method of claim 13, further comprising:
in response to determining that the tracking list in the hash table is not full, adding the unique identifier to the tracking list.

16. The method of claim 13, further comprising:
adding an index of the unique identifier to a next available index in response to the index of the unique identifier colliding with available indices.

17. A data storage device comprising:
a memory comprising a blosk configured to be organized into a plurality of zones of wordlines, each zone comprising a plurality of wordlines;
means for generating a unique identifier based on a physical location in the memory that is associated with a read command, wherein the unique identifier is associated with one of the plurality of zones and wherein the physical location comprises a physical address;
means for searching for the unique identifier in a hash table that tracks how many times each of the plurality of zones has been read;
means for, in response to finding the unique identifier in the hash table, increasing a counter value in an entry in the hash table that is associated with the unique identifier;
means for determining whether the counter value exceeds a threshold; and
means for, in response to determining that the counter value exceeds the threshold, moving the data associated with the zone to a faster memory for faster reading of the data instead of performing a read scrub operation on an entirety of the block based on a number of times the block has been read.

18. The data storage device of claim 17, wherein the data is stored in multi-level cell memory and the faster memory comprises single-level cell memory.

19. The data storage device of claim 17, wherein the unique identifier is generated from one or more of the following: a metablock number and a plane-block number.

20. The data storage device of claim 17, wherein the unique identifier is generated from one or more of the following a physical block number and a wordline zone number.

* * * * *